United States Patent
Wang et al.

(10) Patent No.: US 12,040,739 B2
(45) Date of Patent: Jul. 16, 2024

(54) PHOTOVOLTAIC MOUNT, AND PHOTOVOLTAIC APPARATUS

(71) Applicants: XIAMEN DONESTY ECOMMERCE CO., LTD., Fujian (CN); XIAMEN ECO-SOURCES TECHNOLOGY CO., LTD., Fujian (CN)

(72) Inventors: Hao Wang, Fujian (CN); Hongbing Song, Fujian (CN)

(73) Assignees: XIAMEN DONESTY ECOMMERCE CO., LTD., Fujian (CN); XIAMEN ECO-SOURCES TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/161,063

(22) Filed: Jan. 29, 2023

(65) Prior Publication Data

US 2024/0113654 A1    Apr. 4, 2024

(30) Foreign Application Priority Data

Sep. 29, 2022    (CN) .......................... 202222600215.X (51) Int. Cl.
*H02S 20/32*    (2014.01)
*F16M 11/06*    (2006.01)

(52) U.S. Cl.
CPC ............. *H02S 20/32* (2014.12); *F16M 11/06* (2013.01)

(58) Field of Classification Search
CPC ...................................................... H02S 20/32
See application file for complete search history.

(56) References Cited

U.S. PATENT DOCUMENTS

2015/0285536 A1*  10/2015  Eckl .................... F24S 30/425
                                                          248/122.1

* cited by examiner

Primary Examiner — Jayne L Mershon (57) ABSTRACT

Provided are a photovoltaic mount and a photovoltaic apparatus including the photovoltaic mount. The photovoltaic mount includes a support structure, a first deflection structure, a second deflection structure, and a space truss structure. The first deflection structure is rotatably connected to the support structure by a first rotation shaft. The second deflection structure is rotatably connected to the first deflection structure by a second rotation shaft. An extending direction of the second rotation shaft is different from an extending direction of the first rotation shaft. The space truss structure is installed on the second deflection structure and configured to carry a photovoltaic panel. The space truss structure is driven through a rotation of the first deflection structure and/or a rotation of the second deflection structure to deflect to change an installing angle of the photovoltaic panel.

20 Claims, 4 Drawing Sheets

PHOTOVOLTAIC MOUNT, AND PHOTOVOLTAIC APPARATUS

CROSS-REFERENCE TO RELATED APPLICATIONS

This application is based on and claims priority to Chinese Patent Application No. 202222600215.X, filed on Sep. 29, 2022, the entire content of which is incorporated herein by reference.

FIELD

The present disclosure relates to the technical field of photovoltaic technologies, and more particularly, to a photovoltaic mount, and a photovoltaic apparatus including the photovoltaic mount.

BACKGROUND

A solar photovoltaic assembly is a main device for photoelectric conversion. A power generation amount of a photovoltaic system is related to conversion efficiency of energy in addition to being related to power and operation condition of a battery panel. An amount of received solar illumination directly affects efficiency of the power generation amount. Therefore, an installing mode and an installing angle of the solar photovoltaic assembly have significantly influence on power generation efficiency. Most of traditional solar photovoltaic assemblies are fixedly installed. That is, the battery panel is fixed on a munt structure and is not movable along with a change of a position of the sun, which may affect the conversion efficiency.

SUMMARY

Embodiments of the present disclosure provide a photovoltaic mount, and a photovoltaic apparatus including the photovoltaic mount.

A photovoltaic mount according to the embodiments of the present disclosure includes a support structure, a first deflection structure, a second deflection structure, and a space truss structure (grid structure). The first deflection structure is rotatably connected to the support structure by a first rotation shaft. The second deflection structure is rotatably connected to the first deflection structure by a second rotation shaft. An extending direction of the second rotation shaft is different from an extending direction of the first rotation shaft. The space truss structure is installed on the second deflection structure and configured to carry a photovoltaic panel. The space truss structure is driven through a rotation of the first deflection structure and/or a rotation of the second deflection structure to deflect to change an installing angle of the photovoltaic panel.

In some embodiments, the first deflection structure has a rotation hole. The support structure includes a base and a support body. The support body includes a first end and a second end opposite to the first end. The support body has a first end installed on the base, and a second end including two support walls spaced apart from each other. Each of the two support walls has a first rotation shaft hole. The first deflection structure is interposed between the two support walls. The first rotation shaft passes through the first rotation shaft hole and the rotation hole to allow the first deflection structure and the second deflection structure to be rotatably connected to each other.

In some embodiments, the photovoltaic mount further includes a first drive member. The first drive member is connected to the support body and the first deflection structure and extendable or retractable relative to the support body, to push the first deflection structure to rotate around the first rotation shaft relative to the support body.

In some embodiments, the space truss structure includes at least two first bars spaced apart from each other, at least two second bars spaced apart from each other, and a first connector. Each of the at least two first bars includes a first end and a second end opposite to the first end. The first end of the first bar is connected to the second deflection structure, and the second end of the first bar extends beyond the second deflection structure. An extending direction of each of the at least two second bars is different from an extending direction of each of the at least two first bars. The first connector connects the at least two first bars and the at least two second bars. Two adjacent spaced first bars of the at least two first bars and/or two adjacent spaced second bars of the at least two second bars are configured to carry one photovoltaic panel.

In some embodiments, the first bar has a first through hole. The second bar has a second through hole. The first connector includes an upper fastener, a lower fastener, and a connection screw. The upper fastener is connected to the first bar. The lower fastener is connected to the second bar. The connection screw sequentially passes through the upper fastener, the first through hole, the second through hole, and the lower fastener.

In some embodiments, the space truss structure further includes a plurality of first pressing blocks configured to fix the photovoltaic panel to the first bars and/or the second bars. Each of the plurality of first pressing block includes a first body, a support portion, a first pressing portion, and a first pressing block screw. The first body includes a first end and a second end opposite to the first end, and the first body has a first pressing block hole. The support portion extends from the first end of the first body and supports the first body on the first bars and/or the second bars. The first pressing portion extends from the second end of the first body and presses against the photovoltaic panel. The first pressing block screw passes through the first pressing block hole and the first through hole to fix the first body to the first bar, or passes through the first pressing block hole and the second through hole to fix the first body to the second bar.

In some embodiments, the space truss structure further includes a plurality of second pressing blocks configured to join two adjacent photovoltaic panels. Each of the plurality of second pressing blocks includes a second body, two second pressing portions, and a second pressing block screw. The second body includes a first end and a second end opposite to the first end. The second body has a second pressing block hole. The two second pressing portions extend from the first end of the second body and the second end of the second body, respectively. The two second pressing portions are configured to press against the photovoltaic panels. The second pressing block screw passes through the second pressing block hole and the first through hole to fix the second body to the first bar, or passes through the second pressing block hole and the second through hole to fix the second body to the second bar.

In some embodiments, the space truss structure further includes a second connector for connecting two of the first bars which are located on a same axis, or two of the second bars which are located on the same axis, so as to lengthen the first bar or the second bar.

In some embodiments, the first deflection structure has an engagement portion having an engagement hole. The second deflection structure includes a drive bar, a plurality of lifting bars, and a rotation shaft portion. The drive bar includes a first surface and a second surface opposite to the first surface. The plurality of lifting bars is arranged at intervals on the first surface of the drive bar and connected to the first bar. The rotation shaft portion is disposed on the second surface of the drive bar and engaged with the engagement portion. The rotation shaft portion has a second rotation shaft hole. The second rotation shaft passes through the second rotation shaft hole and the engagement hole to enable the first deflection structure and the second deflection structure to be rotatably connected to each other.

In some embodiments, the photovoltaic mount further includes a support bar and a second drive member. The support bar is connected to the first deflection structure. The second drive member is connected respectively to the lifting bars and the support bar, and extendable or retractable relative to the support bar to push or pull the lifting bars, enabling the lifting bars to drive the drive bar to rotate around the second rotation shaft relative to the first deflection structure.

In some embodiments, the first deflection structure is installed in a north-south direction. The second deflection structure is installed in an east-west direction. A rotatable range of the first deflection structure is smaller than a rotatable range of the second deflection structure.

In some embodiments, the photovoltaic mount further includes a tracking device and a drive structure. The tracking device is disposed on the space truss structure and configured to obtain information on solar radiation intensity. The drive structure is configured to, based on the obtained information on the solar radiation intensity, drive the first deflection structure to rotate around the first rotation shaft relative to the support structure, and/or drive the second deflection structure to rotate around the second rotation shaft relative to the first deflection structure, to drive the space truss structure to deflect.

In some embodiments, the tracking device incudes a plurality of radiation sensors arranged in different orientations of the space truss structure. Each of the plurality of radiation sensor is electrically connected to the drive structure and configured to detect solar radiation and correspondingly generate a solar voltage. The drive structure is configured to drive, based on a plurality of solar voltages, the first deflection structure and/or the second deflection structure to rotate, enabling the space truss structure to deflect towards one, generating a maximum solar voltage, of the plurality of radiation sensor.

In some embodiments, the photovoltaic mount further includes a wind speed sensor electrically connected to the drive structure and configured to detect wind power and correspondingly generate a wind power voltage. The drive structure is further configured to drive, based on the wind power voltage, the first deflection structure and/or the second deflection structure to rotate, enabling the space truss structure to deflect into a horizontal position.

In some embodiments, the tracking device includes a plurality of radiation sensors configured to detect solar radiation and correspondingly generate a solar voltage. The photovoltaic mount further includes a wind speed sensor and a main control board. The main control board is electrically connected to the plurality of radiation sensors, the wind speed sensor, and the drive structure, respectively. The wind speed sensor is configured to detect wind power and correspondingly generate a wind power voltage. The main control board is configured to obtain the solar voltage and the wind power voltage and control, based on magnitudes of the solar voltage and the wind power voltage, the drive structure to drive the first deflection structure and/or the second deflection structure to rotate.

A photovoltaic apparatus according to the embodiments of the present disclosure includes the photovoltaic mount according to any one of the embodiments as described above, and a photovoltaic panel. The photovoltaic panel is installed on the space truss structure of the photovoltaic mount.

Embodiments of the present disclosure further provide a drive method for a photovoltaic mount. The photovoltaic mount includes a support structure, a first deflection structure, a second deflection structure, a space truss structure, a tracking device, and a drive structure. The first deflection structure is rotatably connected to the support structure by a first rotation shaft. The second deflection structure is rotatably connected to the first deflection structure by a second rotation shaft. An extending direction of the second rotation shaft is different from an extending direction of the first rotation shaft. The space truss structure is installed on the second deflection structure and configured to carry a photovoltaic panel. The tracking device is disposed on the space truss structure and configured to obtain a solar radiation intensity. The drive structure is configured to, based on the solar radiation intensity, drive the first deflection structure to rotate around the first rotation shaft relative to the support structure, and/or drive the second deflection structure to rotate around the second rotation shaft relative to the first deflection structure, to drive the space truss structure to deflect. The drive method for the photovoltaic mount includes: driving, based on the solar radiation intensity, the first deflection structure to rotate around the first rotation shaft relative to the support structure, and/or the second deflection structure to rotate around the second rotation shaft relative to the first deflection structure, to drive the space truss structure to deflect.

Additional embodiments of the present disclosure will be partially set forth in the following description and partially become apparent from the following description, or they may be learned by practice of the embodiments of the present disclosure.

BRIEF DESCRIPTION OF THE DRAWINGS

The above and/or additional embodiments of the present disclosure will become apparent and readily understood from the following description of embodiments in conjunction with the accompanying drawings, in which.

DETAILED DESCRIPTION

Embodiments of the present disclosure will be further described below with reference the accompanying drawings, throughout which the same or similar elements, or the elements having same or similar functions, are denoted with same or similar reference numerals.

In addition, the embodiments of the present disclosure described below with reference to the accompanying drawings are illustrative and are only intended to explain the embodiments of the present disclosure, rather than limiting the present disclosure.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

With the photovoltaic mount of the present disclosure and the photovoltaic apparatus including the photovoltaic mount, the first deflection structure and/or the second deflection structure can be driven to rotate, enabling the space truss structure to deflect towards a direction in which solar radiation intensity is high, thereby ensuring that a photovoltaic assembly is always perpendicular to solar rays at a greatest extent. Therefore, the photovoltaic panel carried on the space truss structure can fully receive the solar radiation, which maximizes efficiency of a photovoltaic system, and improves power generation efficiency.

Figure 1:
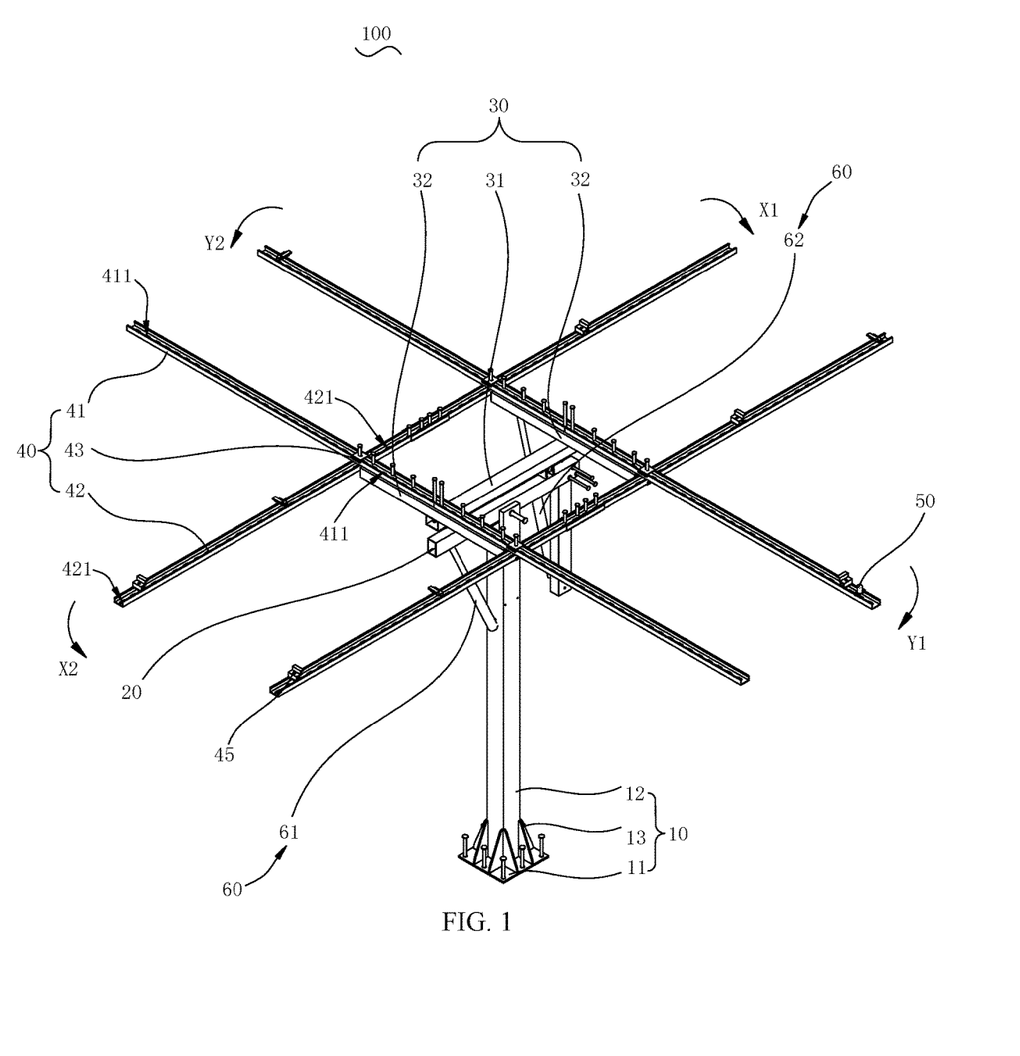
FIG. 1 is a schematic perspective assembly view showing a photovoltaic mount according to some embodiments of the present disclosure.
Figure 2:
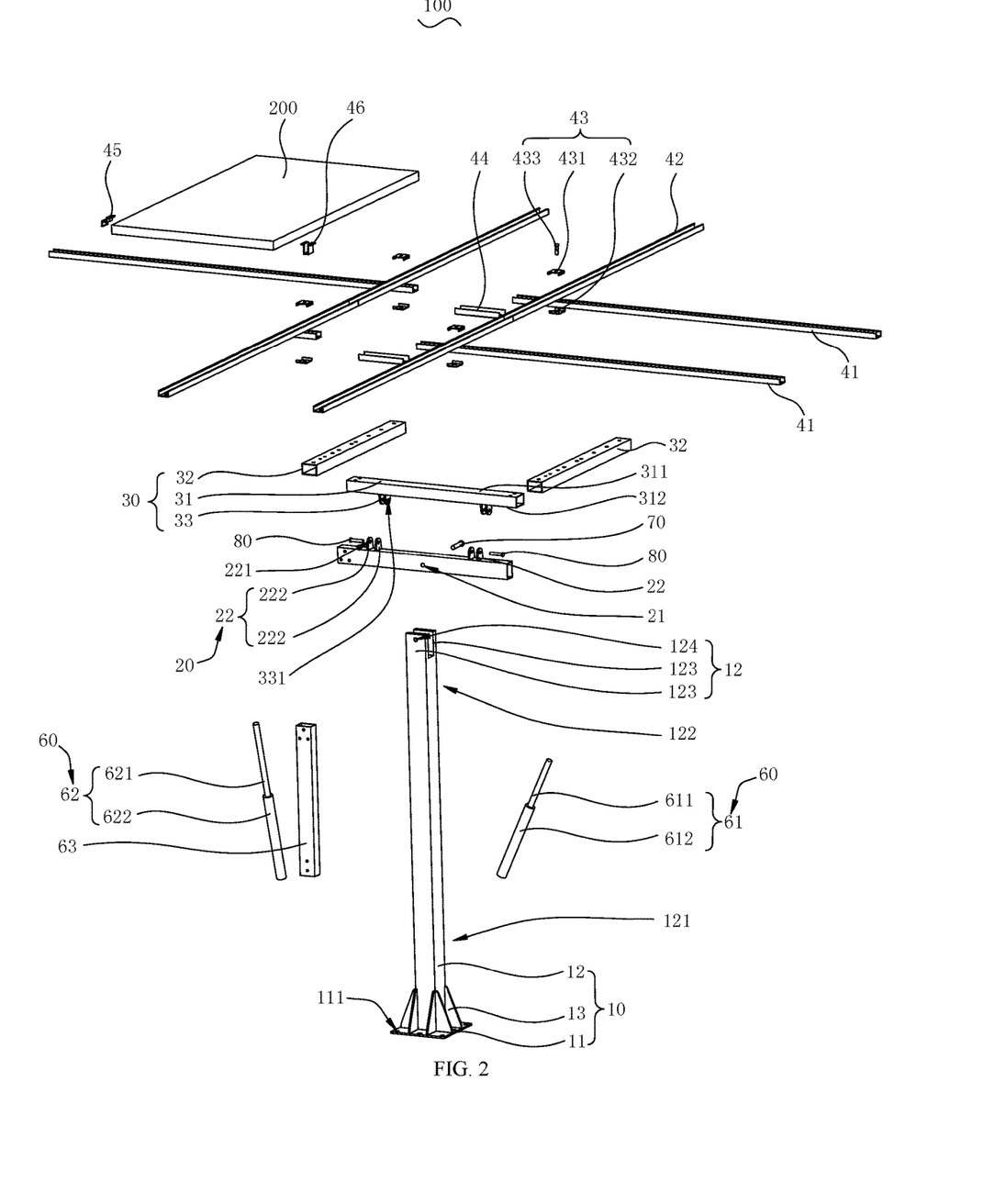
FIG. 2 is a schematic perspective exploded view showing a photovoltaic mount according to some embodiments of the present disclosure.

Referring to FIG. 1 and FIG. 2, embodiments of the present disclosure provide a photovoltaic mount 100. The photovoltaic mount 100 includes a support structure 10, a first deflection structure 20, a second deflection structure 30, and a space truss structure 40. The first deflection structure 20 is rotatably connected to the support structure 10 by a first rotation shaft 70. The second deflection structure 30 is rotatably connected to the first deflection structure 20 by a second rotation shaft 80. An extending direction of the second rotation shaft 80 is different from an extending direction of the first rotation shaft 70. The space truss structure 40 is installed on the second deflection structure 30 and configured to carry a photovoltaic panel 200.

Most traditional photovoltaic mounts 100 are fixedly installed. The photovoltaic panel 200 is immovable as a position of the sun is changed. In the photovoltaic mount 100 according to the embodiments of the present disclosure, in response to the first deflection structure 20 rotating around the first rotation shaft 70 relative to the support structure 10, the space truss structure 40 is driven to deflect in a first direction X1 or a second direction X2, and in response to the second deflection structure 30 rotating around the second rotation shaft 80 relative to the first deflection structure 20, the space truss structure 40 is driven to deflect in a third direction Y1 or a fourth direction Y2. As a result, an installing angle of the photovoltaic panel 200 is changed. In this way, the first deflection structure 20 and/or the second deflection structure 30 can be driven by a manual or automatic device to deflect, enabling the space truss structure 40 to drive the photovoltaic panel 200 to deflect based on the position of the sun. thus, it is possible to ensure that solar can vertically irradiate onto the photovoltaic panel 200 to a greatest extent and improve power generation efficiency. The photovoltaic mount 100 according to the embodiments of the present disclosure will be further described below with reference to the accompanying drawings.

Referring to FIG. 1 and FIG. 2, in some embodiments, the photovoltaic mount 100 further includes a tracking device 50 and a drive structure 60. The tracking device 50 is disposed on the space truss structure 40 and configured to obtain information on solar radiation intensity. The drive structure 60 is configured to drive, based on the obtained information on the solar radiation intensity, the first deflection structure 20 to rotate around the first rotation shaft 70 relative to the support structure 10, and/or the second deflection structure 30 to rotate around the second rotation shaft 80 relative to the first deflection structure 20, to drive the space truss structure 40 to deflect. The drive structure 60 is capable of driving the first deflection structure 20 or the second deflection structure 30 to rotate, respectively. Also, the drive structure 60 is capable of driving both the first deflection structure 20 and the second deflection structure 30 to rotate to enable the space truss structure 40 to drive the photovoltaic panel 200 to deflect. The tracking device 50 disposed on the space truss structure 40 can obtain the information on the solar radiation intensity to enable the drive structure 60 to drive, based on the obtained information on the solar radiation intensity, the first deflection structure 20 and/or the second deflection structure 30 to rotate, enabling the space truss structure 40 to deflect towards a direction in which solar radiation intensity is high. In this way, it is possible to ensure vertical irradiation at the greatest extent, which enables the photovoltaic panel 200 carried on the space truss structure 40 to fully receive solar radiation and improves the power generation efficiency.

In some embodiments, the extending direction of the first rotation shaft 70 is substantially perpendicular to the extending direction of the first rotation shaft 70. Therefore, a deflectable direction of the space truss structure 40 may include various orientations corresponding to east, west, south and north. As a result, the space truss structure 40 has a greater deflectable range and may correspond to a motion trajectory of the sun.

Referring to FIG. 2 again, in some embodiments, the first deflection structure 20 has a rotation hole 21. The support structure 10 includes a base 11 and a support body 12. The support body 12 includes a first end 121 and a second end 122 opposite to the first end 121. The first end 121 of the support body 12 is installed on the base 11. The second end 122 of the support body 12 includes two support walls 123 spaced apart from each other. Each support wall 123 has a first rotation shaft hole 124. The first deflection structure 20 is interposed between the two support walls 123. The first deflection structure 20 and the support structure 10 are rotatably connected to each other by passing first rotation shaft 70 through two first rotation shaft holes 124 and the rotation hole 21. In this way, the first deflection structure 20 is rotatable around the first rotation shaft 70 relative to the support body 12 in the first direction X1 or the second direction X2.

In some embodiments, the support body 12 is a rectangular tube. A length of the support body 12 ranges from 50 mm to 100 mm. For example, the length of the support body 12 may be 50 mm, 60 mm, 70 mm, 80 mm, 90 mm, or 100 mm, etc., which is not listed herein. A width of the support body 12 ranges from 50 mm to 100. For example, the width of the support body 12 may be 50 mm, 60 mm, 70 mm, 80 mm, 90 mm, or 100 mm, etc., which is not listed herein. A thickness of the support body 12 ranges from 2.0 mm to 5.0 mm. For example, the thickness of the support body 12 may be 2.0 mm, 3.0 mm, 4.0 mm, or 5.0 mm, etc., which is not listed herein. The support body 12 of the length, width and thickness in these ranges has a predetermined strength and rigidity, and does not have too heavy weight.

A height of the support body 12 ranges from 1200 mm to 1800 mm. For example, the height of the support body 12 may be 1200 mm, 1300 mm, 1400 mm, 1500 mm, 1600 mm, 1700 mm, or 1800 mm, etc., which is not listed herein. The support body 12 of the height in such a range has a sufficient distance from the ground, which may prevent the space truss structure 40 and the photovoltaic panel 200 from being blocked by objects on the ground. Meanwhile, the distance from the ground is not too high to ensure good wind resistance.

Referring to FIG. 2 again, in some embodiments, the support structure 10 further includes a rib 13. The rib 13 is welded to the second end 122 of the support body 12 and fixedly connected to the base 11 to reinforce a connection between the base 11 and the support body 12 and to improve the wind resistance of the support structure 10. In some embodiments, a thickness of the rib 13 ranges from 4.0 mm to 5.0 mm. For example, the thickness of the rib 13 may be 4.0 mm, 4.2 mm, 4.4 mm, 4.6 mm, 4.8 mm, or 5.0 mm, etc., which is not listed herein.

As illustrated in FIG. 2, in some embodiments, the base 11 has a plurality of thread holes 111 engaged with expansion screws to fix the base 11 into the ground. The expansion screw fixing manner occupies a small area, has easy installation, and is firm and reliable.

Referring to FIG. 1 and FIG. 2, in some embodiments, the drive structure 60 includes a first drive member 61. The first drive member 61 is connected to the support body 12 and the first deflection structure 20 and is extendable or retractable relative to the support body 12, to push the first deflection structure 20 to rotate around the first rotation shaft 70 relative to the support body 12.

In some embodiments, referring to FIG. 2, the first drive member 61 includes a first push rod 611, a first push rod seat 612, and a first motor (not shown). The first push rod seat 612 is connected to the support body 12. The first motor is accommodated within the first push rod seat 612. The first push rod 611 has one end connected to the first motor, and another end connected to the first deflection structure 20. The first push rod 611 is extendable or retractable relative to the first push rod seat 612 with driving of the first motor. Referring to FIG. 1, when the first push rod 611 is driven by the first motor to be extended relative to the first push rod seat 612, the first deflection structure 20 is driven by the first push rod 611 to rotate around the first rotation shaft 70 relative to the support body 12 in the first direction X1. When the first push rod 611 is driven by the first motor to be retracted relative to the first push rod seat 612, the first deflection structure 20 is driven by the first push rod 611 to rotate around the first rotation shaft 70 relative to the support body 12 in the second direction X2. The first push rod 611 may also be held in a fixed position relative to the first push rod seat 612 to provide a support force or a pulling force for the first deflection structure 20. In this way, it is possible to prevent the first deflection structure 20 from rotating by itself around the first rotation shaft 70 relative to the support body 12 by gravity.

In some embodiments, a voltage of the first motor is 12 V or 24 V. The first push rod 611 has a stroke ranging from 100 mm to 150 mm, a pushing force ranging from 1000 N to 2000, and a moving speed ranging from 5.0 m/s to 10.0 m/s. As a result, the first push rod 611 can smoothly drive the first deflection structure 20 to rotate.

Referring to FIG. 2, in some embodiments, the first deflection structure 20 is a rectangular tube. The rotation hole 21 is provided at a symmetric center of the first deflection structure 20. The first push rod 611 is connected to an end portion of the first deflection structure 20. In this way, a position at which a force is exerted to the first deflection structure 20 by the first push rod 611 is far away from a center of the rotation of the first deflection structure 20 relative to the support body 12, which requires a smaller force from the first push rod 611 to drive the first deflection structure 20 to rotate relative to the support body 12.

Referring to FIG. 2 again, in some embodiments, the first deflection structure 20 is provided with an engagement portion 22. The engagement portion 22 has an engagement hole 221. The second deflection structure 30 includes a drive bar 31, a plurality of lifting bars 32, and a rotation shaft portion 33. The drive bar 31 includes a first surface 311 and a second surface 312 opposite to the first surface 311. The plurality of lifting bars 32 is arranged at intervals on the first surface 311 of the drive bar 31. The lifting bars are connected to the space truss structure 40. The rotation shaft portion 33 is disposed on the second surface 312 of the drive bar 31 and engaged with the engagement portion 22. The rotation shaft portion 33 has a second rotation shaft hole 331. The second rotation shaft 80 passes through the second rotation shaft hole 331 and the engagement hole 221 to enable the first deflection structure 20 and the second deflection structure 30 to be rotatably connected to each other.

In some embodiments, two engagement portions 22 are provided. The two engagement portions 22 are symmetrically arranged on the second surface 312 of the drive bar 31 about the rotation hole 21 of the first deflection structure 20. Each engagement portion 22 includes two engagement walls 222 spaced apart from each other. Each of the engagement walls 222 has an engagement hole 221. Two rotation shaft portions 33 are provided. Each rotation shaft portion 33 is inserted between two engagement walls 222 of one engagement portion 22, and each of two second rotation shafts 80 passes through the second rotation shaft hole 331 and the engagement hole 221, to realize the rotatable connection between the first deflection structure 20 and the second deflection structure 30. The two engagement portions 22 symmetrically arranged about the rotation hole 21 of the first deflection structure 20 are connected to the two rotation shaft portions 33, which can improve connection stability.

In some embodiments, the engagement portion 22 is installed to the first deflection structure 20 by welding. In another some embodiments, the engagement portion 22 may extend from the first deflection structure 20 or be integrally formed with the first deflection structure 20, which is not limited herein.

In some embodiments, two lifting bars 32 are provided. The two lifting bars 32 are symmetrically arranged on the first surface 311 of the drive bar about the rotation hole 21 of the first deflection structure 20. The two lifting bars 32 are both connected to the space truss structure 40 to realize a stable connection between the space truss structure 40 and the lifting bars 32. In other embodiments, three, four, five, or more lifting bars 32 may be provided, and the present disclosure is not limited thereto. In one embodiment, the drive bar 31 and the lifting bars 32 are detachably connected by screws to facilitate disassembly and assembly. In another embodiment, the drive bar 31 and the lifting bars 32 may also be fixedly connected by means of welding, adhesive or the like to realize firm installation of the drive bar 31 and the lifting bars 32, which is not limited herein.

Referring to FIG. 1 and FIG. 2, in some embodiments, the drive structure 60 further includes a second drive member 62 and a support bar 63. The support bar 63 is connected to the first deflection structure 20. The second drive member 62 is connected to the lifting bar 32 and the support bar 63, respectively, and is extendable or retractable relative to the support bar 63, to push or pull the lifting bar 32. The lifting bar 32 is rotatable around the second rotation shaft 80 relative to the first deflection structure 20 in the third direction Y1 or the fourth direction Y2 by the rotation shaft portion 33 of the drive bar 31 and the second rotation shaft 80.

The second drive member 62 is connected to the support bar 63 to change a direction in which the second drive member 62 applies a pushing force or a pulling force to the lifting bar 32, to push or pull the lifting bar 32 to a proper position and drive the lifting bar 32 to move with a minimum pushing force or pulling force. Thus, power consumption can be saved. In another some embodiments, the second drive member 62 may also be directly connected to the lifting bar 32 and the first deflection structure 20, which is not limited herein.

Referring to FIG. 2, in some embodiments, the second drive member 62 includes a second push rod 621, a second push rod seat 622, and a second motor (not shown). The second push rod seat 622 is connected to the support bar 63. The second motor is accommodated within the second push rod seat 622. The second push rod 621 has one end connected to the second motor, and another end connected to the lifting bar 32. The second push rod 621 is extendable or retractable relative to the second push rod seat 622 with driving of the second motor. Referring to FIG. 1, in response to the second push rod 621 being driven by the second motor to be extended relative to the second push rod seat 622, the lifting bar 32 is driven by the second push rod 621 to move, to enable the lifting bar 32 to rotate around the second rotation shaft 80 relative to the first deflection structure 20 in the third direction Y1, and in response to the second push rod 621 being driven by the second motor to be retracted relative to the second push rod seat 622, the lifting bar 32 is driven by the second push rod 621 to move, to enable the lifting bar 32 to rotate around the second rotation shaft 80 relative to the first deflection structure 20 in the fourth direction Y2. The second push rod 621 may also be held in the fixed position relative to the second push rod seat 622 to provide the support force or the pulling force for the second deflection structure 30. Thus, it is possible to prevent the second deflection structure 30 from rotating by itself around the second rotation shaft 80 relative to the support body 12 by gravity.

In some embodiments, a voltage of the second motor is 12 V or 24 V. The second push rod 621 has a stoke ranging from 250 mm to 300 mm, a pushing force ranging from 1000 N to 2000 N, and a moving speed ranging from 5.0 m/s to 10.0 m/s. As a result, the second push rod 6121 can smoothly drive the first deflection structure 20 to rotate.

Further, the stroke range of the second push rod 621 is greater than the stroke range of the first push rod 611. As a result, an angle by which the drive bar 31 rotates around the second rotation shaft 80 relative to the first deflection structure 20 in the third direction Y1 or the fourth direction Y2 is greater than an angle by which the first deflection structure 20 rotates around the first rotation shaft 70 relative to the support body 12 in the first direction X1 or the second direction X2. The first direction X1 and the second direction X2 correspond to a south-north direction, and the third direction Y1 and the fourth direction Y2 correspond to an east-west direction. For the northern hemisphere field, the motion trajectory of the sun does not involve the north direction, and for a southern hemisphere field, the motion trajectory of the sun does not involve the south direction. Therefore, a great deflection angle in the south-north direction is not required for the space truss structure 40, and thus a greater movement stroke is not required for the first push rod 611.

Referring to FIG. 1 and FIG. 2, in some embodiments, the space truss structure 40 includes at least two first bars 41 spaced apart from each other, at least two second bars 42 spaced apart from each other, and a first connector 43. Each of the first bars 41 includes a first end and a second end opposite to the first end. The first end of each first bar 41 is connected to the second deflection structure 30. The second end of the first bars 41 extends beyond the second deflection structure 30. An extending direction of the second bar 42 is different from an extending direction of the first bar 41. The first connector 43 connects the first bar 41 and the second bar 42. Further, two adjacent spaced first bars 41 and/or two adjacent spaced second bars 42 are configured to carry one photovoltaic panel 200. For example, the photovoltaic panel 200 may be laid between the two adjacent spaced first bars 41, laid between the two adjacent spaced second bars 42, and laid between a "tic-tac-toe" structure formed by the two adjacent spaced first bars 41 and the two adjacent spaced second bars 42, which is not limited herein.

Referring to FIG. 1 and FIG. 2, in some embodiments, each of the first bars 41 has a first through hole 411. Each of the lifting bars 32 has a first mounting hole. A connection between the first bar 41 and the lifting bar 32 can be realized by passing a bolt through the first through hole 411 and the first mounting hole. In addition, the first bar 41 may be detachable from the lifting bar 32 to facilitate transportation or replacement.

In some embodiments, a plurality of first through holes 411 are provided. The first through holes 411 connected to the first mounting hole by the bolt may be adjusted based on requirements to adjust a relative position between the first bar 41 and the lifting bar 32.

In some embodiments, two first bars 41 and two lifting bars 32 are provided. Each first bar 41 is connected to one lifting bar 32. The first bars 41 disposed on different lifting bars 32 are spaced apart from each other.

In some embodiments, four first bars 41 and two lifting bars 32 are provided. Every two first bars 41 are connected to one lifting bar 32. The first bars 41 disposed on the different lifting bars 32 are spaced apart from each other. In this way, each first bar 41 is not too long, which facilitates transportation.

Referring to FIG. 1 and FIG. 2, in some embodiments, each of the second bars 42 has a second through hole 421. The first connector 43 includes an upper fastener 431, a lower fastener 432, and a connection screw 433. The upper fastener 431 is connected to the first bar 41. The lower fastener 432 is connected to the second bar 42. The connection screw 433 sequentially passes through the upper fastener 431, the first through hole 411, the second through hole 421, and the lower fastener 432, to realize the connection between the first bar 41 and the second bar 42. The upper fastener 431 and the lower fastener 432 can increase a stress point at the connection of the first bar 41 and the second bar 42 to improve strength at the connection.

In some embodiments, a plurality of first through holes 411 is provided, and a plurality of second through holes 421 is provided. A position of one of the plurality of second through holes 421 connected to the respective first through hole 411 through the screw may be adjusted based on the requirements to adjust a relative position between the first bar 41 and the second bar 42.

In some embodiments, each connection screw 433 cooperates with a flat spring washer to fasten the connection screw 433 to prevent the connection screw 433 from loosening.

In some embodiments, both the first bar 41 and the second bar 42 are C-shaped steel. The upper fastener 431 and the lower fastener 432 are U-shaped buckles. The upper fastener 431 is sleeved on the first bars 41, and the lower fastener 432 is sleeved on the second bar 42, to enhance the strength at the connection and prevent shaking from being generated at the connection.

The C-shaped steel has a width ranging from 20 mm to 60 mm. For example, the width of the C-shaped steel is 20 mm, 30 mm, 40 mm, 50 mm, or 60 mm, etc., which is not limited herein. The C-shaped steel has a height ranging from 15 mm to 35 mm. For example, the height of the C-shaped steel is 15 mm, 20 mm, 25 mm, 30 mm, or 35 mm, etc., which is not limited herein. The C-type steel has a thickness ranging from 1.0 mm to 3.0 mm]. For example, the thickness of the C-type steel is 1.0 mm, 1.5 mm, 2.0 mm, 2.5 mm, or 3.0 mm, etc., which is not limited herein. The C-shaped steel has a length ranging from 1200 mm to 2420 mm. For example, the length of the C-shaped steel is 1200 mm, 1600 mm, 2000 mm, 2400 mm, or 2420 mm, etc., which is not limited herein. The C-shaped steel of such type has higher strength and lighter weight.

The U-shaped buckle has a width ranging from 20 mm to 60 mm. For example, the width of the U-shaped buckle is 20 mm, 30 mm, 40 mm, 50 mm, or 60 mm, etc., which is not limited herein. The U-shaped buckle has a thickness ranging from 2.5 mm to 4.5 mm]. For example, the thickness of the U-shaped buckle is 2.5 mm, 3.0 mm, 3.5 mm, 4.0 mm, or 4.5 mm etc., which is not limited herein. The U-shaped buckle has a length ranging from 40 mm to 70 mm. For example, the length of the U-shaped buckle is 40 mm, 50 mm, 60 mm, or 70 mm, etc., which is not limited herein. The U-shaped buckle of such type has higher strength and lighter weight.

Referring to FIG. 2, in some embodiments, the space truss structure 40 further includes a second connector 44 connecting the two first bars 41 or the two second bars 42 on a same axis to extend the first bars 41 or the second bar 42. For example, in the two spaced first bars 41, each first bars 41 is connected to one second bar 42, and the two second bars 42 are connected by the second connector 44, which is equivalent to that the two spaced first bars 41 are together connected to a longer second bar 42. Therefore, it is possible to prevent transportation difficulty due to too long second bar 42.

In some embodiments, the second connector 44 has at least two connection holes (not shown). When the two first bars 41 are connected to each other by the second connector 44, the second connector 44 is sleeved (covered) on a connection between the two first bars 41, one of the at least two connection holes of the second connector 44 is aligned with the first through hole 411 of one of the first bars 41, and the other one of the at least two connection holes is aligned with the first through hole 411 of the other one of the first bars 41. The connection between the second connector 44 and the two first bars 41 can be realized through passing two screws through the two first through holes 411 and the two connection holes, respectively. Similarly, when the two second bars 42 are connected to each other by the second connector 44, the second connector 44 is sleeved on a connection between the two second bars 42, one of the at least two connection holes of the second connector 44 is aligned with the second through hole 421 of one of the second bars 42, and the other one of the at least two connection holes is aligned with the second through hole 421 of the other one of the second bars 42. The connection between the second connector 44 and the two second bars 42 can be realized through passing two screws through the two second through holes 421 and the two connection holes, respectively. The second connector 44 can be sleeved on the two first bars 41 or the two second bars 42, which can enhance connection strength of the two first bars 41 or the two second bars 42.

Figure 3:
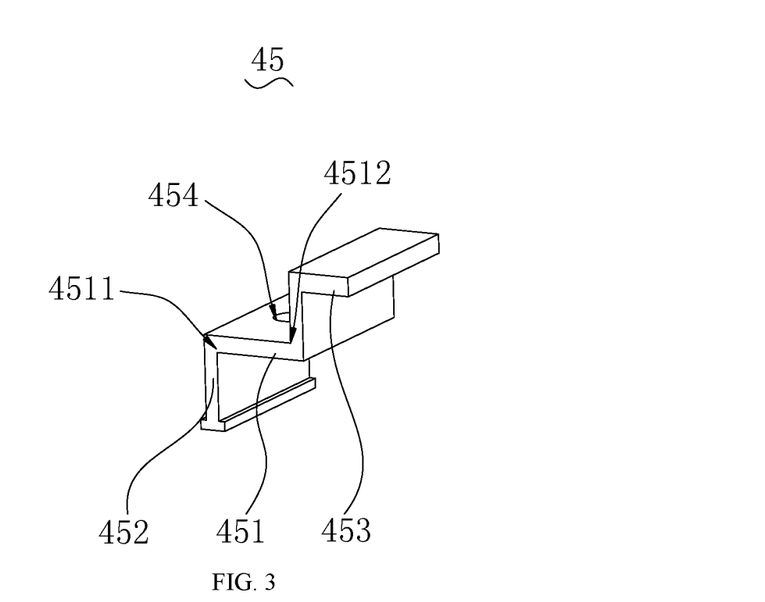
FIG. 3 is a schematic view showing a perspective structure of a first pressing block according to some embodiments of the present disclosure.
Figure 4:
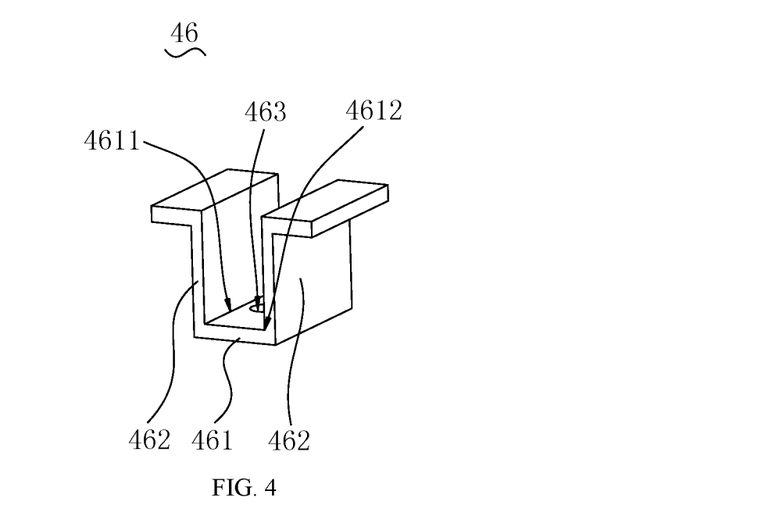
FIG. 4 is a schematic view showing a perspective structure of a second pressing block according to some embodiments of the present disclosure.

Referring to FIG. 1 and FIG. 2, in some embodiments, the space truss structure 40 further includes a plurality of first pressing blocks 45 configured to fix the photovoltaic panel 200 to the first bars 41 and/or the second bars 42. Referring to FIG. 3, each of the plurality of first pressing blocks 45 includes a first body 451, a support portion 452, a first pressing portion 453, and a first pressing block screw (not shown). The first body 451 includes a first end 4511 and a second end 4512 opposite to the first end 4511, and has a first pressing block hole 454. The support portion 452 extends from the first end of 4511 of the first body 451, and supports the first body 451 on the first bar 41 and/or the second bar 42. The first pressing portion 453 extends from the second end 4512 of the first body 451 and is bent in a direction away from the first body 451 to press against the photovoltaic panel 200. The first pressing block screw passes through the first pressing block hole 454 and the first through hole 411 to fix the first body 451 to the first bar 41, or passes through the first pressing block hole 454 and the second through hole 421 to fix the first body 451 to the second bar 42.

Referring to FIG. 1 to FIG. 3, for example, when the photovoltaic panel 200 is fixed to the first bars 41 by using the first pressing blocks 45, the photovoltaic panel 200 is carried on the first bars 41. In this case, the first pressing portion 453 press against a side of the photovoltaic panel 200, and the support portion 452 abuts against the first bars 41. The first pressing block screw passes through the first pressing block hole 454 and the first through hole 411 to fix the first body 451 to the first bar 41. With the gradual screwing of the first pressing block screw, the photovoltaic panel 200 is pressed tightly against the first bar 41 by the first pressing portion 453. Similarly, when the photovoltaic panel 200 is fixed to the second bar 42 by using the first pressing block 45, compared with the case in which the photovoltaic panel 200 is fixed to the first bars 41 by using the first pressing block 45, the difference is only in that the first pressing block screw passes through the first pressing block hole 454 and the second through hole 421 to fix the first body 451 to the second bar 42, and thus the description thereof in detail will be omitted herein.

Referring to FIG. 2 and FIG. 3, in some embodiments, the space truss structure 40 further includes a plurality of second pressing blocks 46. The plurality of second pressing blocks 46 is configured to join two adjacent photovoltaic panels 200, and fix the two adjacent photovoltaic panels 200 to the first bars 41 and/or the second bar 42. Each of the plurality of second pressing blocks 46 includes a second body 461, two second pressing portions 462, and a second pressing block screw. The second body 461 includes a first end 4611 and a second end 4612 opposite to the first end 4611, and has a second pressing block hole 463. The two second pressing portion 462 extend from the first end 461 and the second end of 4612 the second body 461 and bent in a direction away from the second pressing portion 462 respectively to press against the photovoltaic panel 200. The second pressing block screw passes through the second pressing block hole 463 and the first through hole 411 to fix the second body 461 to the first bar 41, or passes through the second pressing block hole 463 and the second through hole 421 to fix the second body 461 to the second bar 42.

Referring to FIG. 2 and FIG. 3, for example, when two adjacent photovoltaic panels 200 are carried on the first bars 41, the two second pressing portion 462 press against two sides of the two photovoltaic panels 200, respectively, to join the two photovoltaic panels 200. Meanwhile, the second body 461 abuts against the first bar 41, and the second pressing block screw passes through the second pressing block hole 463 and the first through hole 411 to fix the second body 461 to the first bar 41. With the gradual screwing of the second pressing block screw, the two photovoltaic panels 200 are pressed tightly against the first bar 41 by the first pressing portion 453. Similarly, when the photovoltaic panel 200 is fixed to the second bar 42 by using the second pressing block 46, compared with the case in which the photovoltaic panel 200 is fixed to the first bars 41 by using the second pressing block 46, the difference is only in that the second pressing block screw passes through the second pressing block hole 463 and the second through hole 421 to fix the second body 461 to the second bar 42, and thus the description thereof in detail will be omitted herein.

Referring to FIG. 1, in some embodiments, the tracking device 50 includes a plurality of radiation sensors arranged in different orientations of the space truss structure 40. The radiation sensors are electrically connected to the drive structure 60. The radiation sensors are configured to detect solar radiation and correspondingly generate a solar voltage. The drive structure 60 is configured to drive, based on a plurality of solar voltages, the first deflection structure 20 and/or the second deflection structure 30 to rotate, enabling the space truss structure 40 to deflect towards one, generating a maximum solar voltage, of the plurality of radiation sensors.

For example, four radiation sensors are arranged in the east, west, south and north directions of the space truss structure 40, respectively. In response to the maximum solar voltage being generated by the radiation sensor arranged in the east direction, the second deflection structure 30 is driven by the drive structure 60 to rotate around the second rotation shaft 80 in the third direction Y1, enabling the space truss structure 40 to deflect eastwards. In response to the maximum solar voltage being generated by the radiation sensor arranged in the west direction, the second deflection structure 30 is driven by the drive structure 60 to rotate around the second rotation shaft 80 in the fourth direction Y2, enabling the space truss structure 40 to deflect westwards. In response to the maximum solar voltage being generated by the radiation sensor arranged in the south direction, the first deflection structure 20 is driven by the drive structure 60 to rotate around the first rotation shaft 70 in the second direction X2, enabling the space truss structure 40 to deflect southwards. In response to the maximum solar voltage being generated by the radiation sensor arranged in the north direction, the first deflection structure 20 is driven by the drive structure 60 to rotate around the first rotation shaft 70 in the first direction X1, enabling the space truss structure 40 to deflect northwards.

In some embodiments, the tracking device 50 is disposed at an end of the first bar 41 or the second bar 42 away from the support structure 10. As a result, greater distances between the tracking devices 50 in different directions is formed, and thus has more orientation representativeness.

In some embodiments, the photovoltaic mount 100 further includes a wind speed sensor (not shown). The wind speed sensor is electrically connected to the drive structure 60 and is configured to detect wind power and correspondingly generate a wind power voltage. The drive structure 60 is further configured to drive, based on the wind power voltage, the first deflection structure 20 and/or the second deflection structure 30 to rotate, enabling the space truss structure 40 to deflect into a horizontal position. For example, when the wind power voltage is greater than a predetermined voltage threshold, the first deflection structure 20 and/or the second deflection structure 30 is driven by the drive structure 60 to rotate, enabling the space truss structure 40 to deflect into the horizontal position. When located at the horizontal position, the space truss structure 40 has a relatively stable gravity center, which has better wind resistance.

In some embodiments, the photovoltaic mount 100 further includes the main control board (not shown). The main control board is electrically connected to the plurality of radiation sensors, the wind speed sensor, and the drive structure 60, respectively. The main control board is configured to obtain information on the solar voltage and the wind power voltage and control, based on information on magnitudes of the obtained solar voltage and wind power voltage, the drive structure 60 to drive the first deflection structure 20 and/or the second deflection structure 30 to rotate.

For example, when the wind power voltage is smaller than the predetermined voltage threshold, the drive structure 60 can drive, based on the plurality of solar voltages, the first deflection structure 20 and/or the second deflection structure 30 to rotate, enabling the space truss structure 40 to deflect towards the radiation sensor generating the maximum solar voltage. When the wind power voltage is greater than the predetermined voltage threshold, the drive structure 60 can drive the first deflection structure 20 and/or the second deflection structure 30 to rotate, enabling the space truss structure 40 to deflect into the horizontal position.

Figure 5:
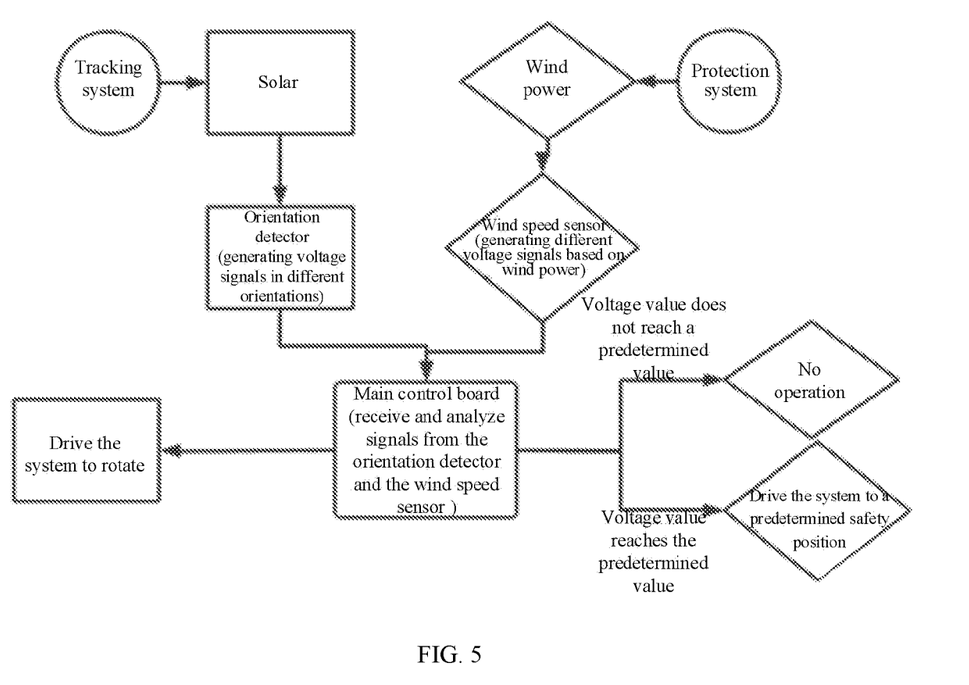
FIG. 5 is a schematic flowchart showing deflection of a photovoltaic mount according to some embodiments of the present disclosure.

Referring to FIG. 5, in some embodiments, a process of tracking solar by a photovoltaic mount will be described below. The process includes: providing a tracking system to track solar. The tracking system includes an orientation detector (a radiation sensor). The process further includes: generating voltage signals in different orientations by means of the orientation detector; receiving and analyzing, by the main control board, the voltage signals obtained by the orientation detector, and determining an orientation of the solar by analyzing magnitudes of the voltage signals in the different orientations; and driving, by the main control board based on the analysis result, the first deflection structure 20 and/or the second deflection structure 30 to rotate.

In some embodiments, a process of a photovoltaic mount deflecting based on a wind power will be described below. The process includes providing a protection system to detect wind power. The protection system includes a wind speed sensor. The process further includes: generating voltage signals in different orientations by means of the wind speed sensor; receiving and analyzing, by a main control board, the voltage signals obtained by the wind speed sensor; performing no operation in response to the voltage signal obtained by the wind speed sensor not reaching a predetermined value; and driving, in response to the voltage signal obtained by the wind speed sensor reaching the predetermined value, a first deflection structure 20 and/or a second deflection structure 30 to rotate, enabling the space truss structure 40 to deflect into a safety position.

Figure 6:
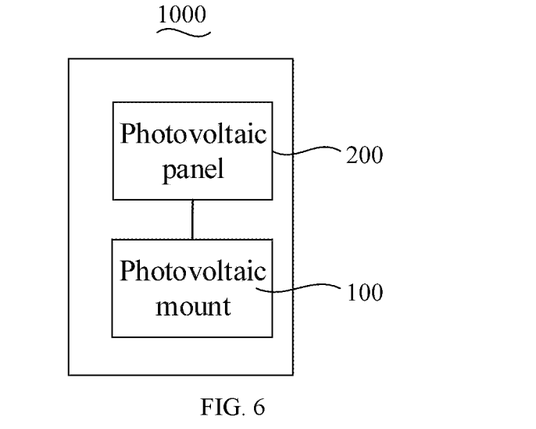
FIG. 6 is a schematic structural view showing a photovoltaic apparatus according to some embodiments of the present disclosure.

Referring to FIG. 6, the present disclosure further provides a photovoltaic apparatus 1000. The photovoltaic apparatus 1000 includes the photovoltaic mount 100 according to any one of the above embodiments and a photovoltaic panel 200. The photovoltaic panel 200 is installed on the space truss structure 40 of the photovoltaic mount 100. Referring to FIG. 1, in the photovoltaic apparatus according to the embodiments of the present disclosure, the tracking device 50 disposed on the space truss structure 40 can obtain the solar radiation intensity to enable the drive structure 60 to drive, based on the solar radiation intensity, the first deflection structure 20 and/or the second deflection structure 30 to rotate, enabling the space truss structure 40 to deflect towards a direction in which solar radiation intensity is high. As a result, the photovoltaic panel 200 carried on the space truss structure 40 can fully receive the solar radiation, and the power generation efficiency can be improved.

In the description of this specification, descriptions with reference to the terms "some embodiments", "an implementation", "some embodiments", "schematic embodiments", "examples", "specific examples", or "some examples" etc., mean that specific features, structure, materials or characteristics described in conjunction with the embodiment or example are included in at least one embodiments or example of the present disclosure. In this specification, the schematic representations of the above terms do not necessarily refer to the same implementation or example. Moreover, the described specific features, structures, materials or characteristics may be combined in any one or more embodiments or examples in a suitable manner.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, such as two, three, etc., unless otherwise specifically defined. Although the embodiments of the present disclosure have been shown and described above, it should be understood that the above-mentioned embodiments are exemplary and should not be construed as limiting the present disclosure. For those of ordinary skill in the art, changes, alternatives, and modifications can be made to the above-mentioned embodiments without departing from the scope of the present disclosure. The scope of the present disclosure shall be defined by the claims as appended and their equivalents.

What is claimed is:

1. A photovoltaic mount, comprising:
    a support structure;
    a first deflection structure rotatably connected to the support structure by a first rotation shaft;
    a second deflection structure rotatably connected to the first deflection structure by a second rotation shaft, an extending direction of the second rotation shaft being different from an extending direction of the first rotation shaft; and
    a space truss structure installed on the second deflection structure and configured to carry a photovoltaic panel, the space truss structure being driven through a rotation of the first deflection structure and/or a rotation of the second deflection structure to deflect or change an installing angle of the photovoltaic panel.

2. The photovoltaic mount according to claim 1, wherein:
    the first deflection structure has a rotation hole; and
    the support structure comprises:
        a base; and
        a support body comprising a first end and a second end opposite to the first end, wherein the support body has a first end installed on the base, and a second end comprising two support walls spaced apart from each other, each of the two support walls having a first rotation shaft hole, wherein the first deflection structure is interposed between the two support walls, and wherein the first rotation shaft passes through the first rotation shaft hole and the rotation hole to allow the first deflection structure and the second deflection structure to be rotatably connected to each other.

3. The photovoltaic mount according to claim 2, further comprising a first drive member, the first drive member being connected to the support body and the first deflection structure and extendable or retractable relative to the support body, to push the first deflection structure to rotate around the first rotation shaft relative to the support body.

4. The photovoltaic mount according to claim 1, wherein the space truss structure comprises:
    at least two first bars spaced apart from each other, each of the at least two first bars comprising a first end and a second end opposite to the first end, the first end of the first bar being connected to the second deflection structure, and the second end of the first bar extending beyond the second deflection structure;
    at least two second bars spaced apart from each other, an extending direction of each of the at least two second bars being different from an extending direction of each of the at least two first bars; and
    a first connector for connecting the first bars and the second bars,
    wherein two adjacent spaced first bars of the at least two first bars and/or two adjacent spaced second bars of the at least two second bars are configured to carry one photovoltaic panel.

5. The photovoltaic mount according to claim 4, wherein:
    the first bar has a first through hole;
    the second bar has a second through hole; and
    the first connector comprises an upper fastener, a lower fastener, and a connection screw, the upper fastener being connected to the first bar, the lower fastener being connected to the second bar, and the connection screw sequentially passing through the upper fastener, the first through hole, the second through hole, and the lower fastener.

6. The photovoltaic mount according to claim 5, wherein the space truss structure further comprises a plurality of first pressing blocks configured to fix the photovoltaic panel to the first bars and/or the second bars, each of the plurality of first pressing block comprising:
    a first body comprising a first end and a second end opposite to the first end, the first body having a first pressing block hole;
    a support portion extending from the first end of the first body and supporting the first body on the first bars and/or the second bars;
    a first pressing portion extending from the second end of the first body and configured to press against the photovoltaic panel; and
    a first pressing block screw passing through the first pressing block hole and the first through hole to fix the first body to the first bar, or passing through the first pressing block hole and the second through hole to fix the first body to the second bar.

7. The photovoltaic mount according to claim 5, wherein the space truss structure further comprises a plurality of second pressing blocks configured to join two adjacent photovoltaic panels, each of the plurality of second pressing blocks comprising:
a second body comprising a first end and a second end opposite to the first end, the second body having a second pressing block hole;
two second pressing portions extending from the first end of the second body and the second end of the second body, respectively, the two second pressing portions being configured to press against the photovoltaic panels; and
a second pressing block screw passing through the second pressing block hole and the first through hole to fix the second body to the first bar, or passing through the second pressing block hole and the second through hole to fix the second body to the second bar.

8. The photovoltaic mount according to claim 5, wherein the space truss structure further comprises a second connector for connecting two first bars located on a same axis, or two second bars located on a same axis, to lengthen the first bar or the second bar.

9. The photovoltaic mount according to claim 4, wherein:
the first deflection structure has an engagement portion, the engagement portion having an engagement hole; and
the second deflection structure comprises:
a drive bar comprising a first surface and a second surface opposite to the first surface;
a plurality of lifting bars arranged at intervals on the first surface of the drive bar and connected to the first bar; and
a rotation shaft portion disposed on the second surface of the drive bar and engaged with the engagement portion, the rotation shaft portion having a second rotation shaft hole, the second rotation shaft passing through the second rotation shaft hole and the engagement hole to enable the first deflection structure and the second deflection structure to be rotatably connected to each other.

10. The photovoltaic mount according to claim 9, further comprising:
a support bar connected to the first deflection structure; and
a second drive member connected respectively to the lifting bars and the support bar and extendable or retractable relative to the support bar to push or pull the lifting bars, enabling the lifting bars to drive the drive bar to rotate around the second rotation shaft relative to the first deflection structure.

11. The photovoltaic mount according to claim 1, wherein:
the first deflection structure is installed in a north-south direction;
the second deflection structure is installed in an east-west direction; and
a rotatable range of the first deflection structure is smaller than a rotatable range of the second deflection structure.

12. The photovoltaic mount according to claim 1, further comprising:

a tracking device disposed on the space truss structure and configured to obtain information on solar radiation intensity; and
a drive structure configured to, based on the obtained information on the solar radiation intensity, drive the first deflection structure to rotate around the first rotation shaft relative to the support structure, and/or drive the second deflection structure to rotate around the second rotation shaft relative to the first deflection structure, to drive the space truss structure to deflect.

13. The photovoltaic mount according to claim 12, wherein:
the tracking device comprises a plurality of radiation sensors arranged in different orientations of the space truss structure, each of the plurality of radiation sensor being electrically connected to the drive structure and configured to detect solar radiation and correspondingly generate a solar voltage; and
the drive structure is configured to drive, based on a plurality of solar voltages, the first deflection structure and/or the second deflection structure to rotate, enabling the space truss structure to deflect towards one, generating a maximum solar voltage, of the plurality of radiation sensor.

14. The photovoltaic mount according to claim 12, further comprising a wind speed sensor electrically connected to the drive structure and configured to detect wind power and correspondingly generate a wind power voltage,
wherein the drive structure is further configured to drive, based on the wind power voltage, the first deflection structure and/or the second deflection structure to rotate, enabling the space truss structure to deflect into a horizontal position.

15. The photovoltaic mount according to claim 12, wherein:
the tracking device comprises a plurality of radiation sensors configured to detect solar radiation and correspondingly generate a solar voltage;
the photovoltaic mount further comprises a wind speed sensor and a main control board, the main control board being electrically connected to the plurality of radiation sensors, the wind speed sensor, and the drive structure, respectively, the wind speed sensor being configured to detect wind power and correspondingly generate a wind power voltage, and the main control board being configured to obtain the solar voltage and the wind power voltage and control, based on magnitudes of the solar voltage and the wind power voltage, the drive structure to drive the first deflection structure and/or the second deflection structure to rotate.

16. A photovoltaic apparatus, comprising:
the photovoltaic mount according to claim 1; and
a photovoltaic panel installed on the space truss structure of the photovoltaic mount.

17. The photovoltaic apparatus according to claim 16, wherein:
the first deflection structure has a rotation hole; and
the support structure comprises:
a base; and
a support body comprising a first end and a second end opposite to the first end, wherein the support body has a first end installed on the base, and a second end comprising two support walls spaced apart from each other, each of the two support walls having a first rotation shaft hole, wherein the first deflection structure is interposed between the two support walls, and wherein the first rotation shaft passes through the first rotation shaft hole and the rotation hole to allow the first deflection structure and the second deflection structure to be rotatably connected to each other.

18. The photovoltaic apparatus according to claim 17, further comprising a first drive member, the first drive member being connected to the support body and the first deflection structure and extendable or retractable relative to the support body, to push the first deflection structure to rotate around the first rotation shaft relative to the support body.

19. The photovoltaic apparatus according to claim 16, wherein the space truss structure comprises:
- at least two first bars spaced apart from each other, each of the at least two first bars comprising a first end and a second end opposite to the first end, the first end of the first bar being connected to the second deflection structure, and the second end of the first bar extending beyond the second deflection structure;
- at least two second bars spaced apart from each other, an extending direction of each of the at least two second bars being different from an extending direction of each of the at least two first bars; and
- a first connector for connecting the at least two first bars and the at least two second bars, wherein two adjacent spaced first bars of the at least two first bars and/or two adjacent spaced second bars of the at least two second bars are configured to carry one photovoltaic panel.

20. The photovoltaic apparatus according to claim 19, wherein:
- the first bar has a first through hole;
- the second bar has a second through hole; and
- the first connector comprises an upper fastener, a lower fastener, and a connection screw, the upper fastener being connected to the first bar, the lower fastener being connected to the second bar, and the connection screw sequentially passing through the upper fastener, the first through hole, the second through hole, and the lower fastener.

* * * * *